US009270142B2

(12) United States Patent
Alexander

(10) Patent No.: US 9,270,142 B2
(45) Date of Patent: Feb. 23, 2016

(54) SYSTEMS AND METHODS FOR UNINTERRUPTIBLE POWER SUPPLIES WITH BIDIRECTIONAL POWER CONVERTERS

(71) Applicant: Ideal Power Inc., Austin, TX (US)

(72) Inventor: William C. Alexander, Spicewood, TX (US)

(73) Assignee: IDEAL POWER INC., Austin, TX (US)

( * ) Notice: Subject to any disclaimer, the term of this patent is extended or adjusted under 35 U.S.C. 154(b) by 0 days.

(21) Appl. No.: 14/678,765

(22) Filed: Apr. 3, 2015

(65) Prior Publication Data
US 2015/0222147 A1 Aug. 6, 2015

Related U.S. Application Data

(63) Continuation of application No. 14/265,315, filed on Apr. 29, 2014, now Pat. No. 9,077,185.

(60) Provisional application No. 61/817,092, filed on Apr. 29, 2013.

(51) Int. Cl.
H02J 1/12 (2006.01)
H02J 3/32 (2006.01)
(Continued)

(52) U.S. Cl.
CPC ... *H02J 9/00* (2013.01); *H02J 5/00* (2013.01); *H02J 7/35* (2013.01); *H02J 9/061* (2013.01); *H02J 9/062* (2013.01); *H02J 9/066* (2013.01); *H02J 9/08* (2013.01); *H02M 7/797* (2013.01); *Y02B 10/72* (2013.01); *Y02E 10/566* (2013.01);
(Continued)

(58) Field of Classification Search
CPC ....... H02J 9/00; Y10T 307/50; Y10T 307/615
USPC ..................................................... 307/46, 64
See application file for complete search history.

(56) References Cited

U.S. PATENT DOCUMENTS 8,988,900 B2 * 3/2015 Toliyat ................ H02M 5/4585
363/17
2011/0133556 A1 6/2011 Choi
(Continued)

FOREIGN PATENT DOCUMENTS

JP H10341544 A 12/1998
KR 10-2008-0032839 A 4/2008

OTHER PUBLICATIONS

KIPO International Search Report for PCT/US2014/035960, Sep. 22, 2014.
(Continued)

Primary Examiner — Carlos Amaya
(74) Attorney, Agent, or Firm — Groover & Associates PLLC; Robert Groover; Gwendolyn Groover

(57) ABSTRACT

Electrical power systems and methods using bidirectional power converters to provide, among other functions, uninterruptible power supplies for loads such as cell towers. The power-packet-switching power converter can be connected, for example, to a photovoltaic array, batteries, and a critical load such as a cell tower. An AC generator can also be connected in order to power the cell tower and/or to charge the batteries as needed. Green energy utilization is maximized, power conversion efficiency is increased, and system costs are decreased, by having only a single power conversion stage for all conversions.

8 Claims, 5 Drawing Sheets

(51) Int. Cl.
  *H02J 3/34* (2006.01)
  *H02J 9/00* (2006.01)
  *H02M 7/797* (2006.01)
  *H02J 9/06* (2006.01)
  *H02J 5/00* (2006.01)
  *H02J 7/35* (2006.01)
  *H02J 9/08* (2006.01)

(52) U.S. Cl.
  CPC .......... *Y10T 307/336* (2015.04); *Y10T 307/344* (2015.04); *Y10T 307/50* (2015.04); *Y10T 307/516* (2015.04); *Y10T 307/615* (2015.04)

(56) References Cited

U.S. PATENT DOCUMENTS

2012/0014151 A1  1/2012  Alexander
2012/0175949 A1  7/2012  Stiesdal et al.

OTHER PUBLICATIONS

KIPO Written Opinion for PCT/US2014/035960, Sep. 22, 2014.

* cited by examiner

SYSTEMS AND METHODS FOR UNINTERRUPTIBLE POWER SUPPLIES WITH BIDIRECTIONAL POWER CONVERTERS

CROSS-REFERENCE

Priority is claimed from U.S. Provisional 61/817,092 filed Apr. 29, 2013, which is hereby incorporated by reference.

BACKGROUND

The present application relates generally to power converters, and more specifically, to uninterruptible power supplies (UPS) with photovoltaic array and battery.

Note that the points discussed below may reflect the hindsight gained from the disclosed inventions, and are not necessarily admitted to be prior art.

A new kind of power converter was disclosed in U.S. Pat. No. 7,599,196 entitled "Universal power conversion methods," which is incorporated by reference into the present application in its entirety. This patent describes a bidirectional (or multidirectional) power converter which pumps power into and out of a link inductor which is shunted by a capacitor.

The switch arrays at the ports are operated to achieve zero-voltage switching by totally isolating the link inductor+capacitor combination at times when its voltage is desired to be changed. (When the inductor+capacitor combination is isolated at such times, the inductor's current will change the voltage of the capacitor, as in a resonant circuit. This can even change the sign of the voltage, without loss of energy.) This architecture has subsequently been referred to as a "current-modulating" or "Power Packet Switching" architecture. Bidirectional power switches are used to provide a full bipolar (reversible) connection from each of multiple lines, at each port, to the rails connected to the link inductor and its capacitor. The basic operation of this architecture is shown, in the context of the three-phase to three-phase example of patent FIG. 1, in the sequence of drawings from patent FIG. 12a to patent FIG. 12j.

The ports of this converter can be AC or DC, and will normally be bidirectional (at least for AC ports). Individual lines of each port are each connected to a "phase leg," i.e. a pair of switches which permit that line to be connected to either of two "rails" (i.e. the two conductors which are connected to the two ends of the link inductor). It is important to note that these switches are bidirectional, so that there are four current flows possible in each phase leg: the line can source current to either rail, or can sink current from either rail.

Many different improvements and variations are shown in the basic patent. For example, variable-frequency drive is shown (for controlling a three-phase motor from a three-phase power line), DC and single-phase ports are shown (patent FIG. 21), as well as three- and four-port systems, applications to photovoltaic systems (patent FIG. 23), applications to Hybrid Electric vehicles (patent FIG. 24), applications to power conditioning (patent FIG. 29), half-bridge configurations (patent FIGS. 25 and 26), systems where a transformer is included (to segment the rails, and allow different operating voltages at different ports) (patent FIG. 22), and power combining (patent FIG. 28).

Improvements and modifications of this basic architecture have also been disclosed in U.S. Pat. Nos. 8,391,033, 8,295,069, 8,531,858, and 8,461,718, all of which are hereby incorporated by reference.

The term "converter" has sometimes been used to refer specifically to DC-to-DC converters, as distinct from DC-AC "inverters" and/or AC-AC frequency-changing "cycloconverters." However, in the present application the word converter is used more generally, to refer to all of these types and more, and especially to converters using a current-modulating or power-packet-switching architecture.

Photovoltaic arrays and other renewable power generation systems have become common around the world in recent years, mainly due to growing costs of fuel based power generation. These renewable power generation systems can allow sustaining a micro-grid. However, renewable power generation systems demand a series of power conversion stages which can result in reduced efficiency as well as higher costs of production. For example, the power for a structure such as a cell tower can be provided by a PV array and a series of batteries. However, for this system to work, a direct current (DC) to alternating current (AC) converter may be needed for the photovoltaic array to supply power to the cell tower. Furthermore, an AC to DC converter may be needed in order for this power to charge the batteries. Finally, when required, the power from the batteries may need a second DC to AC converter in order to reach the cell tower.

For the aforementioned reasons, there is a need for a single stage power conversion system in order to optimize UPS systems within micro-grids.

Systems and Methods for Uninterruptible Power Supplies with Bidirectional Power Converters The present application teaches, among other innovations, methods and systems using bidirectional power converters to provide, among other functions, uninterruptible power supplies for loads such as cell towers. The power-packet-switching power converter can be connected, for example, to a photovoltaic array, batteries, and a critical load such as a cell tower. An AC generator can also be connected in order to power the cell tower and/or to charge the batteries as needed. Green energy utilization is maximized, power conversion efficiency is increased, and system costs are decreased, by having only a single power conversion stage for all conversions.

BRIEF DESCRIPTION OF THE DRAWINGS

The disclosed inventions will be described with reference to the accompanying drawings, which show important sample embodiments and which are incorporated in the specification hereof by reference, wherein.

DETAILED DESCRIPTION OF SAMPLE EMBODIMENTS

Figure 1:
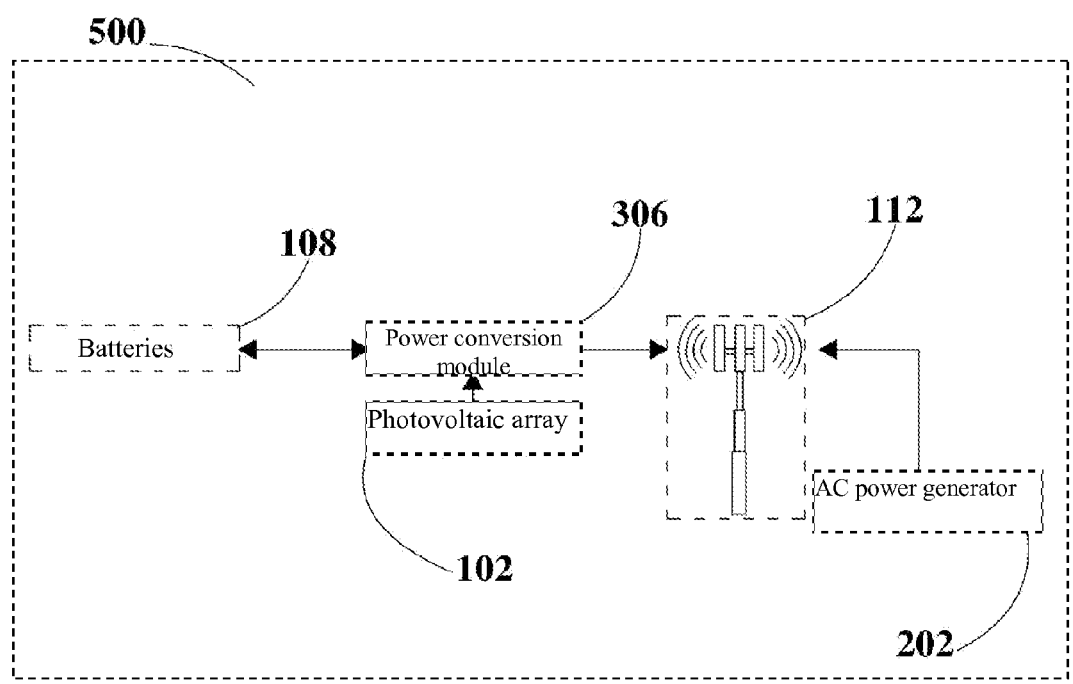
FIG. 1 shows one sample embodiment of a power conversion system.

The numerous innovative teachings of the present application will be described with particular reference to presently preferred embodiments (by way of example, and not of limitation). The present application describes several inventions, and none of the statements below should be taken as limiting the claims generally.

The present application discloses new approaches to converting DC power to AC power and AC power to DC power using a three-port power converter configured as an uninterruptible power supply (UPS).

Some exemplary parameters will be given to illustrate the relations between these and other parameters. However it will be understood by a person of ordinary skill in the art that these values are merely illustrative, and will be modified by scaling of further device generations, and will be further modified to adapt to different materials or architectures if used.

The present application teaches that bidirectional power converters can be used as uninterruptible power supplies (UPS) for loads such as cell towers. A bidirectional power converter can be connected to one or more photovoltaic arrays, one or more batteries, and a cell tower. The photovoltaic arrays can be used to power the cell tower when possible, and can direct any excess power into the batteries to be stored for later use. The batteries can then be used to supplement or replace the photovoltaic arrays when the arrays are generating no or insufficient power to support the cell tower.

A single bidirectional power conversion system can support multiple independent DC ports in a single power conversion stage, therefore increasing power generation efficiency and reducing costs. Disclosed three-port power conversion modules can eliminate the power electronics related inefficiency and cost penalties of integrating an AC power generator, a stationary battery, and a photovoltaic array. Furthermore, this three-port topology can allow storing energy generated by a photovoltaic array to a battery or series of batteries. This energy can thereafter be used to supply AC power to a structure such as a cell tower; the three-port power conversion module converting the DC power from the photovoltaic array and the battery or series of batteries into AC power.

The AC power generator may be used when energy from a photovoltaic array and one or more batteries is lower than the energy required by a cell tower. Excess AC power can be supplied to charge the battery by routing through the three-port power conversion module to convert the AC power from the AC power generator into DC power to supply to the battery or series of batteries.

DEFINITIONS

All scientific and technical terms used in the present disclosure have meanings commonly used in the art, unless otherwise specified. The definitions provided herein are to facilitate understanding of certain terms used frequently and are not meant to limit the scope of the present disclosure.

"Power converter" refers to electromechanical devices used for conversion of electric energy from one form into another from an input to an output, including DC to DC, DC to AC, and AC-AC, single and three phases and different voltage levels and frequencies, among other variations.

"Link" refers to a resonant circuit including at least one link inductor and one link capacitor connected in parallel.

"Soft switching" refers to a zero voltage switching that prevents switching losses and stress when current passes through switches in a power converter.

Figure 5:
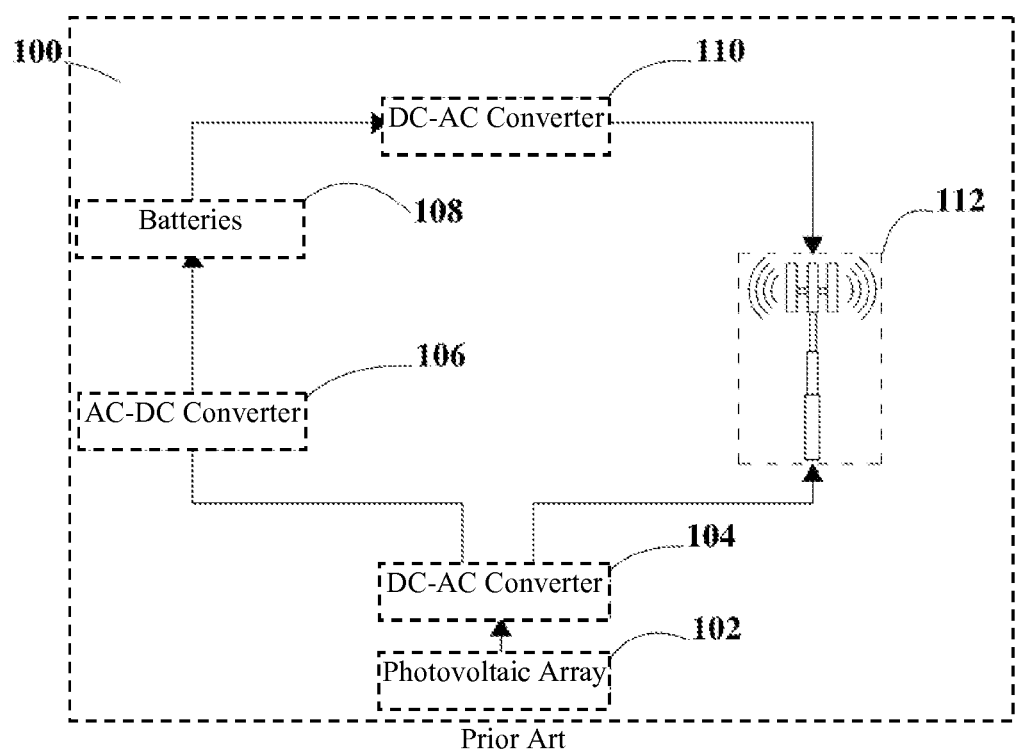
FIG. 5 shows a schematic view of a power conversion system, according to the prior art.

FIG. 5 schematically shows a view for a first power conversion system 100 under the prior art. First power conversion system 100 can include photovoltaic array 102, first DC-AC converter 104, AC-DC converter 106, batteries 108, second DC-AC converter 110, and cell tower 112.

In first power conversion system 100, photovoltaic array 102 and batteries 108 can provide constant AC power to cell tower 112. As depicted, DC power generated by photovoltaic array 102 can be transferred to a first DC-AC converter 104 to convert DC power into AC power to supply AC power to cell tower 112. Furthermore, AC generated by first DC-AC converter 104 can be transferred to an AC-DC converter 106 and used to charge batteries 108 with converted DC power. Power from batteries 108 can thereafter be transferred to a second DC-AC converter 110 to power cell tower 112 with AC power.

As depicted, batteries 108 can supply sufficient power during power outages of photovoltaic array 102 to power cell tower 112. Additionally, when power generation from photovoltaic array 102 is zero, batteries 108 can supply the complete power requirement from cell tower 112. Furthermore, when power requirement from cell tower 112 is lower than the power generated by photovoltaic array 102, the remaining power from photovoltaic array 102 can be used to charge batteries 108.

Figure 2:
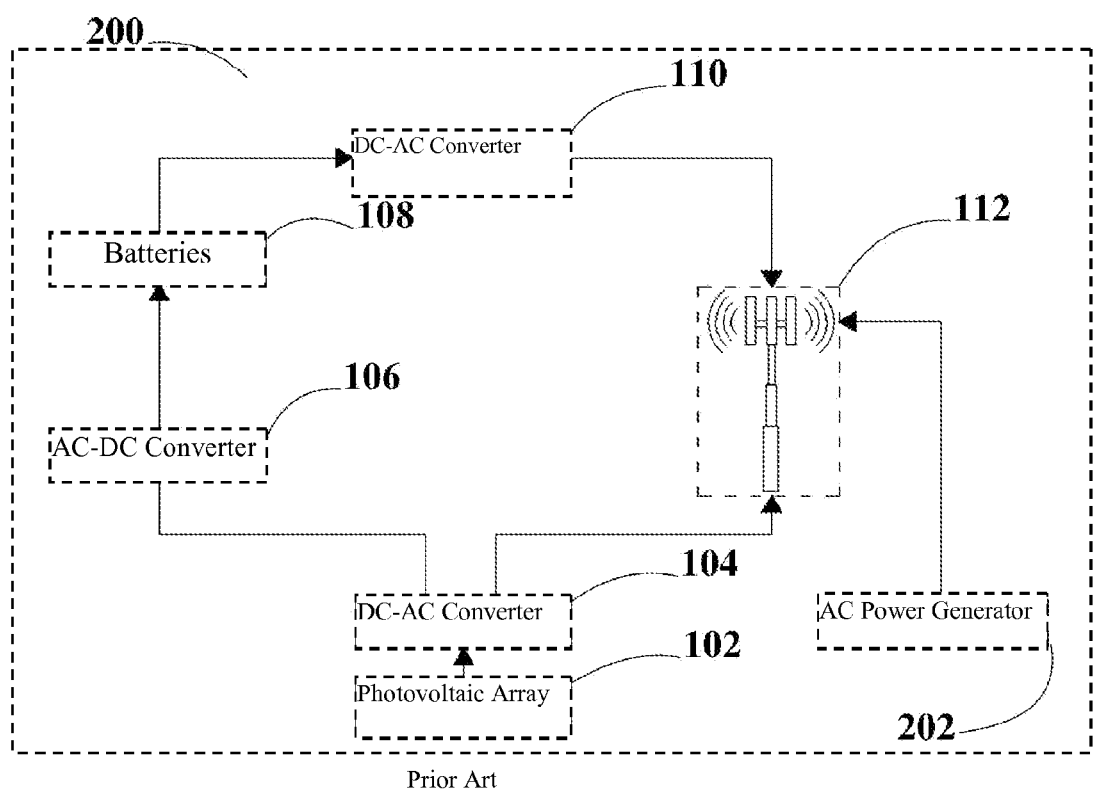
FIG. 2 shows a schematic view for a second power conversion system, according to the prior art.

FIG. 2 depicts a schematic view for a second power conversion system 200, according to the prior art. With reference to FIG. 6, second power conversion system 200 can include photovoltaic array 102, first DC-AC converter 104, AC-DC converter 106, batteries 108, second DC-AC converter 110, cell tower 112, and AC power generator 202.

As depicted, in second power conversion system 200, photovoltaic array 102, batteries 108, or AC power generator 202 can provide constant AC power to cell tower 112. DC generated by photovoltaic array 102 can be transferred to a first DC-AC converter 104 to supply AC power to cell tower 112. Furthermore, AC generated by first DC-AC converter 104 can be transferred to an AC-DC converter 106 to charge batteries 108. Power from batteries 108 can thereafter be transferred to second DC-AC converter 110 to supply power to cell tower 112.

Batteries 108 can supply sufficient power during power outages of photovoltaic array 102 to power cell tower 112. Additionally, when power generation from photovoltaic array 102 is zero, batteries 108 can supply the complete power requirement of cell tower 112. Furthermore, when power requirement from cell tower 112 is lower than the power generated by photovoltaic array 102, the remaining power from photovoltaic array 102 can be used to charge batteries 108. AC power generator 202 may be used to supply AC power when batteries 108 are depleted and power from photovoltaic array 102 is low or zero.

FIG. 1 shows a schematic view for a power conversion system 500, according to an embodiment. Power conversion system 500 can include photovoltaic array 102, conversion module 306, batteries 108, cell tower 112, and AC power generator 202. Where batteries 108 can refer to first input portal 302, photovoltaic array 102 can refer to second input portal 304, and cell tower 112 can refer to output portal 308 (explained in FIG. 3).

In power conversion system 500, photovoltaic array 102, batteries 108, or AC power generator 202 can provide constant AC power to cell tower 112. According to power conversion system 500, DC generated by photovoltaic array 102 can be transferred to conversion module 306 and converted into AC to supply AC power to cell tower 112. Furthermore, when power requirement from cell tower 112 is lower than the power generated by photovoltaic array 102, power from photovoltaic array 102 can charge batteries 108.

Batteries 108 can supply sufficient power to cell tower 112 during power outages of photovoltaic array 102, so when power generation from photovoltaic array 102 is zero, batteries 108 can supply the complete power requirement to cell tower 112. AC power generator 202 can be used to supply AC power when batteries 108 are depleted and power from photovoltaic array 102 is low or zero. Additionally, when AC power generator 202 supplies more power than required by cell tower 112, the excess power can be routed to batteries 108 through conversion module 306. The power conversion module 306 can then convert the excess AC power supplied from power generator 202 into DC power to charge batteries 108.

A control circuit (not shown) in the power conversion system 500 includes sensor circuitry able to detect power levels delivered by the AC power generator 202 and photovoltaic array 102, batteries 108, and required by the cell tower 112. The control circuit can control the conversion module 306 to route and convert power between the input/output portals as described above. Also, the control circuit can include switches and other control means to activate the AC power generator 202 and switch over to supply power to the cell tower 112 from the AC power generator 202 using the conversion module 306 when photovoltaic array 102 and batteries 108 deliver insufficient AC power to the cell tower 112.

The 3-port power conversion system 300 used in power conversion system 500 can perform AC-DC and DC-AC conversions in one single stage, therefore decreasing costs of production and increasing efficiency.

Figure 3:
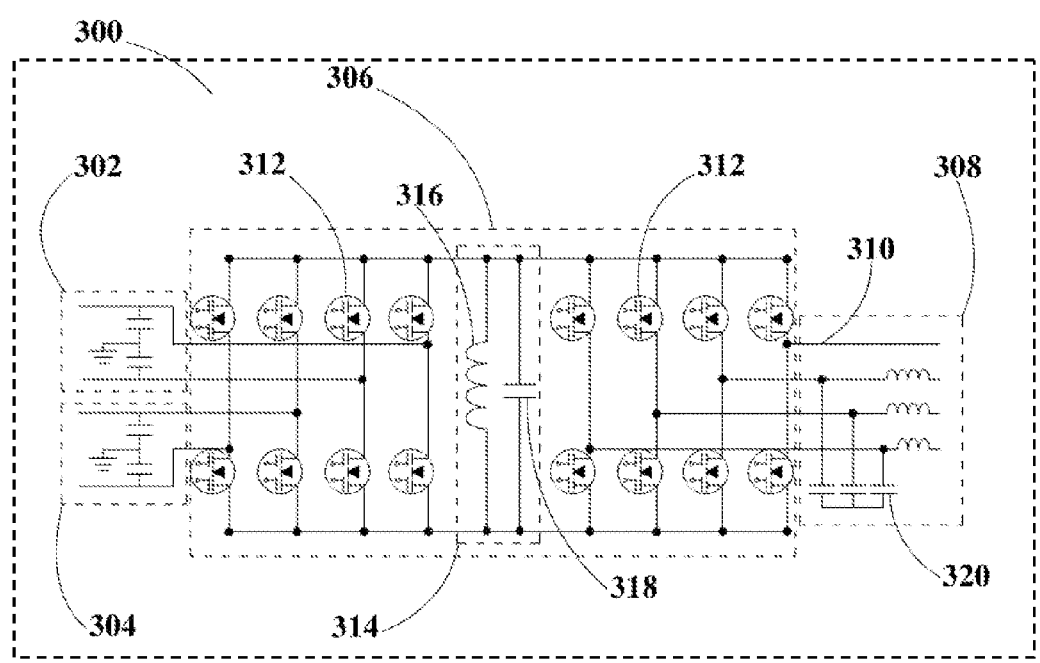
FIG. 3 shows a schematic view for a bidirectional 3-port power conversion system, according to an embodiment.

FIG. 3 shows a bidirectional three-port power conversion system 300, in accordance with the present disclosure. Three-port power conversion system 300 can be used to convert energy from first input portal 302 and second input portal 304, passing through conversion module 306 to output portal 308 while adjusting a wide range of voltages, current levels, power factors, and frequencies between the portals.

According to an exemplary embodiment, first input portal 302 can include a DC generator, such as batteries 108. Second input portal 304 can include a second DC port such as photovoltaic array 102. Output portal 308 can be a three phase AC port enhanced with an active neutral 310 to support microgrid functionality. Furthermore, output portal 308 can include an AC-powered structure, such as cell tower 112.

As depicted, conversion module 306 can include different bidirectional switches 312 connected between first input portal 302, second input portal 304, and link 314 to output portal 308. Each of bidirectional switches 312 can conduct and block current in two directions, and can be composed of bidirectional internal gate bipolar transistors (IGBTs) or other bidirectional switches. Most combinations of bidirectional switches contain two independently controlled gates, with each gate controlling current flow in one direction. Generally, in the exemplary embodiments described and depicted, when switches are enabled, only the gate that controls current in the desired direction is enabled.

Link 314 can include link inductor 316 and link capacitor 318, connected in parallel with link inductor 316, forming a resonant circuit that can allow for soft switching and flexibility of adjusting link 314 voltage to meet individual needs of first input portal 302, second input portal 304, and output portal 308. Additionally, link 314 can provide isolation between first input portal 302, second input portal 304, and output portal 308, eliminating the need for a transformer, as well as improving speed of response and reducing acoustic noise in case of frequency being outside audible range.

Furthermore, as depicted, filter capacitors 320 can be placed between input phases and also between output phases, in order to closely approximate first input portal 302, second input portal 304, and output portal 308, and to attenuate current pulses produced by the bidirectional switches 312 and link inductor 316. An input line reactor can be needed in some applications to isolate the voltage ripple on the input and output filter capacitors 320.

Figure 4:
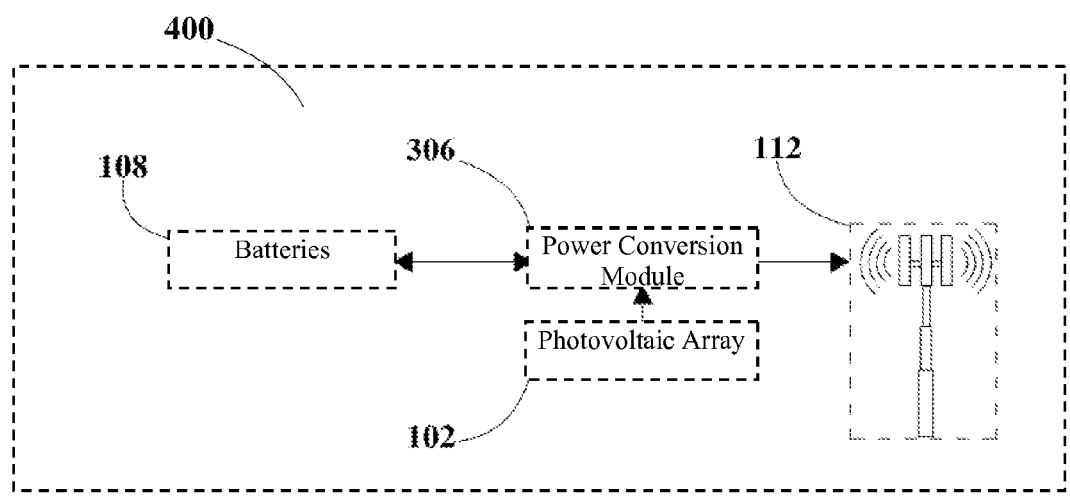
FIG. 4 shows a schematic view for a third power conversion system, according to an embodiment.

FIG. 4 shows a schematic view for a third power conversion system 400, according to an exemplary embodiment. As depicted, third power conversion system 400 can include photovoltaic array 102, conversion module 306, batteries 108, and cell tower 112. Batteries 108 can connect to first input portal 302, photovoltaic array 102 can connect to second input portal 304, and cell tower 112 can connect to output portal 308 (explained in FIG. 3).

In third power conversion system 400, photovoltaic array 102 and batteries 108 can provide constant AC power to cell tower 112. DC generated by photovoltaic array 102 can be transferred to conversion module 306 to convert into AC power and supply AC power to cell tower 112. Furthermore, when power requirement from cell tower 112 is lower than the AC power generated by photovoltaic array 102, the excess power generated by photovoltaic array 102 can be converted to DC by power module 306 and used to charge batteries 108.

Batteries 108 can supply sufficient power during power outages from photovoltaic array 102 to power cell tower 112, with the conversion module 306 converting the batteries 108 DC power into AC power. Additionally, when power generation from photovoltaic array 102 is zero, batteries 108 can supply the complete AC power requirement for cell tower 112.

The 3-port power conversion system 300 used in third power conversion system 400 can perform AC-DC and DC-AC conversions in one single stage, therefore decreasing costs of production and increasing efficiency.

Variations

In a first variation, third power conversion system 400 supplies power to one or more residential houses instead of cell tower 112. In a second variation, fourth power conversion system 500 supplies power to a commercial building instead of cell tower 112. In a third variation, fourth power conversion system 500 supplies power to an industrial building instead of cell tower 112. As can be readily appreciated, any number of types of powered devices or installations can be substituted for cell tower 112.

Advantages

The disclosed innovations, in various embodiments, provide one or more of at least the following advantages. However, not all of these advantages result from every one of the innovations disclosed, and this list of advantages does not limit the various claimed inventions.

Reduce weight and costs.

Improve efficiency.

Simplify control.

Reduce the complexity of a power energy system harnessing solar generated DC, battery generated DC, and generator generated AC energy by eliminating at least one power conversion stage.

Improve power availability and reliability by utilizing two separate energy sources for generating electrical power.

Realize synergistic benefits from an integration of two separate energy sources into one electric power converter system.

According to some but not necessarily all embodiments, there is provided: Electrical power systems and methods using bidirectional power converters to provide, among other functions, uninterruptible power supplies for loads such as cell towers. The power-packet-switching power converter can be connected, for example, to a photovoltaic array, batteries, and a critical load such as a cell tower. An AC generator can also be connected in order to power the cell tower and/or to charge the batteries as needed. Green energy utilization is maximized, power conversion efficiency is increased, and system costs are decreased, by having only a single power conversion stage for all conversions.

According to some but not necessarily all embodiments, there is provided: An electrical power system, comprising: a multiport power converter, comprising a plurality of electrical ports, each having at least two lines, and an energy transfer reactance comprising an inductor and a capacitor in parallel, wherein each said line of each said port is connected to each end of said energy transfer reactance through multiple respective bidirectional switches; a DC power source connected to a first one of said ports, and an AC power source connected to a second one of said ports, a third one of said ports being connected to lines of a utility power grid, and a fourth one of said ports being connected to an electrical load; and wherein said converter draws power from said first, second, and/or third ports, and drives power into said first, third, and/or fourth ports, while changing the frequency and/or phase of power received at said second port to thereby provide power synchronously to said third and/or fourth ports, and while also compensating transients when power is output to said first port, to thereby provide a smooth power waveform.

According to some but not necessarily all embodiments, there is provided: An electrical power system, comprising: a multiport power converter, comprising a plurality of electrical ports, each having at least two lines, and an energy transfer reactance comprising an inductor and a capacitor in parallel, wherein each said line of each said port is connected to each end of said energy transfer reactance through multiple respective bidirectional switches; one or more DC power sources connected to respective first ones of said ports, and one or more AC power sources connected to respective second ones of said ports, a third one of said ports being connected through switchgear to lines of a utility power grid, and one or more fourth ones of said ports being connected to provide one or more respective electrical load terminals, and; wherein said converter draws power from said first, second, and/or third ports, and drives power into said first, third, and/or fourth ports, while changing the frequency and/or phase of power received at said one or more second ports to thereby provide power synchronously to said third and/or fourth ports, and while also compensating transients when power is output to said one or more first ports, to thereby provide a smooth power waveform.

According to some but not necessarily all embodiments, there is provided: An electrical power system, comprising: a bidirectional multiport power converter, comprising: a plurality of input/output portals, each comprising one or more ports; an energy transfer reactance comprising an inductor and a capacitor in parallel, wherein each said port of each said input/output portal is connected in parallel to each end of said energy transfer reactance by a pair of bidirectional switching devices; wherein, at various times, said energy transfer reactance can be connected to two said ports, to transfer energy there between; and wherein, at various times, said energy transfer reactance can be disconnected from said input/output portals; a DC power source connected to a first said input/output portal of said bidirectional multiport power converter supplying converted AC power to an electrical load under normal condition, said electrical load being connected to a second said input/output portal; at least one battery connected to a third said input/output portal of said bidirectional multiport power converter; wherein said at least one battery supplies AC power to the electrical load when said electrical load requires more AC power than said DC power source can supply.

According to some but not necessarily all embodiments, there is provided: A method for providing uninterruptible power, comprising the actions of: using a bidirectional multiport power converter to convert and route a power input, wherein the bidirectional multiport power converter comprises: a plurality of input/output portals, each comprising one or more ports; an energy transfer reactance comprising an inductor and a capacitor in parallel, wherein each said port of each said input/output portal is connected in parallel to each end of said energy transfer reactance by a pair of bidirectional switching devices; wherein, at various times, said energy transfer reactance can be connected to two said ports, to transfer energy there between; and wherein, at various times, said energy transfer reactance can be disconnected from said input/output portals; connecting a DC power source to a first input/output portal of the bidirectional multiport power converter to supply converted AC power to an AC-powered construct under normal condition, the AC-powered construct connected to a second input/output portal; connecting a plurality of batteries to a third input/output portal of the bidirectional multiport power converter; and operating the bidirectional multiport power converter to supply AC power to the AC-powered construct from the plurality of batteries if the DC power source fails to deliver sufficient DC power to convert and supply an AC power requirement to the AC-powered construct.

According to some but not necessarily all embodiments, there is provided: An uninterruptible power system, comprising: a bidirectional multiport power converter, comprising: a plurality of input/output portals, each comprising one or more ports; an energy transfer reactance comprising an inductor and a capacitor in parallel, wherein each said port of each said input/output portal is connected in parallel to each end of said energy transfer reactance by a pair of bidirectional switching devices; wherein, at various times, said energy transfer reactance can be connected to two said ports, to transfer energy there between; and wherein, at various times, said energy transfer reactance can be disconnected from said input/output portals; a DC power source generating a first DC power signal connected to a first input/output portal of the bidirectional multiport power converter supplying converted power under normal conditions to a load connected to a second input/output portal of the bidirectional multiport power converter; a bank of batteries storing power to provide a second DC power signal connected to a third input/output portal of the bidirectional multiport power converter; and an AC generator connected to the load; wherein the bank of batteries supplies a converted required power to the load when the load requires more required power than the DC power source can generate; and the AC generator activating to supply the required power to the load when the load requires more required power than the DC power source can generate and the bank of batteries can supply.

According to some but not necessarily all embodiments, there is provided: A method for providing uninterruptible power, comprising: using a bidirectional multiport power converter to convert and route a power input, wherein the bidirectional multiport power converter comprises: a plurality of input/output portals, each comprising one or more ports; an energy transfer reactance comprising an inductor and a capacitor in parallel, wherein each said port of each said input/output portal is connected in parallel to each end of said energy transfer reactance by a pair of bidirectional switching devices; wherein, at various times, said energy transfer reactance can be connected to two said ports, to transfer energy there between; and wherein, at various times, said energy transfer reactance can be disconnected from said input/output portals; generating a first DC power signal using a DC power source connected to a first input/output portal of the bidirectional multiport power converter supplying converted power under normal conditions to a load connected to a second input/output portal of the bidirectional multiport power converter; storing power in a bank of batteries to provide a second DC power signal connected to a third input/output portal of the bidirectional multiport power converter; connecting an AC generator to the load; and activating the AC generator to supply the required power to the load when the load requires more required power than the DC power source can generate and the bank of batteries can supply wherein the bank of batteries supplies a converted required power to the load when the load requires more required power than the DC power source can generate.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In one possible variant, the power system can be utilized in maritime applications, supplementing sail or diesel power.

Another possible variation is in light aircraft, more specifically in surveillance drones. In one possible embodiment, the drone can incorporate solar power cells in the wings, batteries, and an internal combustion engine or diesel engine powering a dual mode generator that can also functions as a motor. The dual mode generator is geared and connected to 3-port power conversion module, so that in the event of engine failure, the dual mode generator can begin functioning as an electric motor powering the drone until landing powered by converted DC to AC power from the power conversion module provided by the solar power cells or batteries.

Another possible variation provides supplemental and backup power to a computer server facility. In the event of a power failure or shortage of power, supplemental and emergency power can be provided by solar, batteries, and an emergency generator according to an embodiment.

Other possible facilities or installations requiring uninterruptible power can included medical clinics and hospitals, labs, security/monitoring systems, assisted living facilities, and nursing homes or other health care facilities.

Additional general background, which helps to show variations and implementations, may be found in the following publications, all of which are hereby incorporated by reference: US 2012/0032507; U.S. Pat. No. 8,013,472; U.S. Pat. No. 7,656,059; U.S. Pat. No. 7,560,906; U.S. Pat. No. 7,531,915.

Additional general background, which helps to show variations and implementations, as well as some features which can be implemented synergistically with the inventions claimed below, may be found in the following US patent applications. All of these applications have at least some common ownership, copendency, and inventorship with the present application, and all of them, as well as any material directly or indirectly incorporated within them, are hereby incorporated by reference: U.S. Pat. No. 8,406,265, U.S. Pat. No. 8,400,800, U.S. Pat. No. 8,395,910, U.S. Pat. No. 8,391,033, U.S. Pat. No. 8,345,452, U.S. Pat. No. 8,300,426, U.S. Pat. No. 8,295,069, U.S. Pat. No. 7,778,045, U.S. Pat. No. 7,599,196, US 2012-0279567 A1, US 2012-0268975 A1, US 2012-0274138 A1, US 2013-0038129 A1, US 2012-0051100 A1, Ser. Nos. 14/182,243, 14/182,236, PCT/US14/16740, Ser. Nos. 14/182,245, 14/182,246, 14/183,403, 14/182,249, 14/182,250, 14/182,251, 14/182,256, 14/182,268, 14/183,259, 14/182,265, 14/183,415, 14/182,280, 14/183,422, 14/182,252, 14/183,245, 14/183,274, 14/183,289, 14/183,309, 14/183,335, 14/183,371, 14/182,270, 14/182,277, 14/207,039, 14/209,885; U.S. Provisionals 61/765,098, 61/765,099, 61/765,100, 61/765,102, 61/765,104, 61/765,107, 61/765,110, 61/765,112, 61/765,114, 61/765,116, 61/765,118, 61/765,119, 61/765,122, 61/765,123, 61/765,126, 61/765,129, 61/765,131, 61/765,132, 61/765,137, 61/765,139, 61/765,144, 61/765,146 all filed Feb. 15, 2013; 61/778,648, 61/778,661, 61/778,680, 61/784,001 all filed Mar. 13, 2013; 61/814,993 filed Apr. 23, 2013; 61/817,012, 61/817,019, 61/817,092 filed Apr. 29, 2013; 61/838,578 filed Jun. 24, 2013; 61/841,618, 61/841,621, 61/841,624 all filed Jul. 1, 2013; 61/914,491 and 61/914,538 filed Dec. 11, 2013; 61/924,884 filed Jan. 8, 2014; 61/925,311 filed Jan. 9, 2014; 61/928,133 filed Jan. 16, 2014; 61/928,644 filed Jan. 17, 2014; 61/929,731 and 61/929,874 filed Jan. 21, 2014; 61/931,785 filed Jan. 27, 2014; 61/932,422 filed Jan. 28, 2014; and 61/933,442 filed Jan. 30, 2014; and all priority applications of any of the above thereof, each and every one of which is hereby incorporated by reference.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:
1. An uninterruptible power system, comprising:
a bidirectional multiport power converter, comprising:
a plurality of input/output portals, each comprising one or more ports;
an energy transfer reactance comprising an inductor and a capacitor in parallel, wherein each said port of each said input/output portal is connected in parallel to each end of said energy transfer reactance by a pair of bidirectional switching devices;
wherein, at various times, said energy transfer reactance can be connected to two said ports, to transfer energy there between; and
wherein, at various times, said energy transfer reactance can be disconnected from said input/output portals;
a DC power source generating a first DC power signal connected to a first input/output portal of the bidirectional multiport power converter supplying converted power under normal conditions to a load connected to a second input/output portal of the bidirectional multiport power converter;
a bank of batteries storing power to provide a second DC power signal connected to a third input/output portal of the bidirectional multiport power converter; and
an AC generator connected to the load;
wherein the bank of batteries supplies a converted required power to the load when the load requires more required power than the DC power source can generate; and
the AC generator activating to supply the required power to the load when the load requires more required power than the DC power source can generate and the bank of batteries can supply.

2. The uninterruptible power system of claim 1, wherein, when the DC source is generating more power than the required power to power the load, operating the bidirectional multiport power converter to convert the excess required power to a charging DC power signal to provide to the bank of batteries to charge the bank of batteries.

3. The uninterruptible power system of claim 1, wherein, when the DC source is generating less power than the required power to power the load, operating the bidirectional multiport power converter to deliver the required power to the load from the third input/output portal from the bank of batteries.

4. The uninterruptible power system of claim 1, wherein, when the AC generator is generating more power than the required power to power the load, the excess power is used to charge the bank of batteries.

5. The uninterruptible power system of claim 1, wherein the AC power source comprises a generator.

6. The uninterruptible power system of claim 5, wherein the generator comprises a dual mode generator that can function as a motor.

7. The uninterruptible power system of claim 1, wherein the load comprises at least one of:
 an installation;
 a building;
 a commercial building;
 a conveyance;
 a communication tower; and
 a computer server facility.

8. The uninterruptible power system of claim 1, wherein the DC source generator comprises a photovoltaic array.

* * * * *